(12) United States Patent
Ma et al.

(10) Patent No.: US 11,578,806 B2
(45) Date of Patent: Feb. 14, 2023

(54) SEAL AND REGULATOR VALVE

(71) Applicant: ILLINOIS TOOL WORKS INC., Glenview, IL (US)

(72) Inventors: Yue Ma, Shanghai (CN); Michael Henker, Shanghai (CN); Ziteng Zheng, Shanghai (CN)

(73) Assignee: ILLINOIS TOOL WORKS INC., Glenview, IL (US)

( * ) Notice: Subject to any disclaimer, the term of this patent is extended or adjusted under 35 U.S.C. 154(b) by 120 days.

(21) Appl. No.: 17/144,876

(22) Filed: Jan. 8, 2021

(65) Prior Publication Data
US 2021/0215258 A1 Jul. 15, 2021

(30) Foreign Application Priority Data

Jan. 10, 2020 (CN) .......................... 202010027174.2
Dec. 15, 2020 (CN) .......................... 202011477743.X

(51) Int. Cl.
*F16K 5/06* (2006.01)
*F01P 7/16* (2006.01)
*F16K 11/087* (2006.01)
*F01P 7/14* (2006.01)

(52) U.S. Cl.
CPC .............. *F16K 5/0689* (2013.01); *F01P 7/16* (2013.01); *F16K 5/0678* (2013.01); *F16K 11/0873* (2013.01); *F01P 2007/146* (2013.01)

(58) Field of Classification Search
CPC .... F16K 5/0689; F16K 5/0678; F16K 5/0673; F16K 11/0873; F01P 7/16; F01P 2007/146
See application file for complete search history.

(56) References Cited

U.S. PATENT DOCUMENTS 1,157,956 A * 10/1915 Osborne ............... F16K 5/0673
251/317
2,373,628 A * 4/1945 Gleeson ............... F16K 5/0678
251/315.12
(Continued)

FOREIGN PATENT DOCUMENTS

DE 202015100400 U1 * 6/2016
EP 3553355 A1 * 10/2019 ............... F01P 7/14
(Continued)

OTHER PUBLICATIONS

Office Action from corresponding German Patent Application No. 10 2021 100 211.7, dated Apr. 8, 2022 (11 pages).

*Primary Examiner* — David Colon-Morales
(74) *Attorney, Agent, or Firm* — Quarles & Brady LLP

(57) ABSTRACT

The present disclosure discloses a seal and a regulating valve having the seal. The seal is used for sealing a flow channel between a pipe orifice of a housing and a valve body in the regulating valve. The seal includes an elastic member and an embedded member. The elastic member is ring-shaped, the embedded member is at least partially embedded in the elastic member, and the hardness of the embedded member is greater than that of the elastic member. The seal of the present disclosure has a simple structure, which not only enables miniaturization of the structure of the regulating valve, but also can simplify assembly steps of the regulating valve, thus facilitating assembly automation of the regulating valve.

20 Claims, 7 Drawing Sheets

(56) References Cited

U.S. PATENT DOCUMENTS

| | | | | |
|---|---|---|---|---|
| 2,841,429 | A * | 7/1958 | McCuistion | F16J 15/3236 277/587 |
| 2,983,533 | A * | 5/1961 | Tisch | F16J 15/32 277/649 |
| 3,014,690 | A * | 12/1961 | Boteler | F16K 5/202 251/315.11 |
| 3,173,648 | A * | 3/1965 | McGuire | F16K 5/0673 251/315.11 |
| 3,210,042 | A * | 10/1965 | Freeman | F16K 5/0678 251/315.05 |
| 3,272,472 | A * | 9/1966 | Goldman | F16K 5/0678 251/315.08 |
| 3,356,337 | A * | 12/1967 | Olen | F16K 5/0631 251/315.13 |
| 3,397,861 | A * | 8/1968 | Scaramucci | F16K 5/0673 277/369 |
| 3,486,733 | A * | 12/1969 | Gordon, Jr. | F16K 5/0673 251/315.05 |
| 3,610,575 | A * | 10/1971 | Yoneda | F16K 5/0673 251/315.08 |
| 4,061,307 | A * | 12/1977 | Yoshiike | F16K 5/0673 251/315.08 |
| 5,746,417 | A * | 5/1998 | Bowers | F16K 5/0636 251/188 |
| 5,944,055 | A * | 8/1999 | Dicky | F16K 11/0873 251/148 |
| 8,500,090 | B2 * | 8/2013 | Hubacek | F16K 5/0673 251/192 |
| 9,383,020 | B2 * | 7/2016 | Jackson | F16K 1/2266 |
| 10,816,100 | B2 * | 10/2020 | Na | F16K 5/18 |
| 11,143,316 | B2 * | 10/2021 | Park | F16K 5/20 |
| 2021/0079833 | A1 * | 3/2021 | Popa | F16K 25/005 |

FOREIGN PATENT DOCUMENTS

| | | |
|---|---|---|
| GB | 1209238 A | 10/1970 |
| JP | H01206167 A * | 8/1989 |
| JP | H01206167 A | 8/1989 |

\* cited by examiner

SEAL AND REGULATOR VALVE

CROSS REFERENCES TO RELATED APPLICATIONS

This application claims the benefit of Chinese Patent Application No. 202010027174.2, filed on Jan. 10, 2020, and Chinese Patent Application No. 202011477743.X, filed on Dec. 15, 2020, both of which are incorporated herein by reference in their entirety.

TECHNICAL FIELD

The present disclosure relates to the technical field of seals, and in particular to a seal applied to a regulating valve.

BACKGROUND

Regulating valves are often used in automobiles to control a flow path and a flow rate of a coolant by regulating a relative position between a fluid channel in the valve and an external flow-through pipeline, so as to achieve the purpose of regulating a working temperature of engine related components. As a demand for automobile emission control and fuel economy increases in an automobile industry, manufacturing of automobiles requires a more complex thermal management solution. The regulating valve is used in an auxiliary cooling circuit of an automobile cooling system, which is particularly important for realization of the complex thermal management solution.

SUMMARY OF THE DISCLOSURE

An object of the present disclosure is to provide a seal with a simple structure, which facilitates simplifying the structure of a regulating valve and facilitates assembly automation of the regulating valve. In addition, the seal of the present disclosure utilizes the cooperating relationship of materials with different elastic coefficients that ensure stable installation of the seal and an effective sealing of a fluid passage in the regulating valve.

One aspect of the present disclosure is to provide a seal for sealingly connecting a housing and a valve body in a regulating valve, wherein the seal comprises an elastic member and an embedded member. The elastic member is ring-shaped, the embedded member is at least partially embedded in the elastic member, the hardness of the embedded member is greater than that of the elastic member, and the elastic coefficient of the elastic member is greater than that of the embedded member. The embedded member with a greater hardness can support the elastic member to ensure the stable installation of the seal, and the elastic member with a larger elastic coefficient enables a sealing function of the whole seal through its deformation.

As for the seal described above, the embedded member comprises a supporting portion and a blocking portion, the supporting portion is embedded in the elastic member, and the blocking portion is connected to the supporting portion and at least partially extends out of the elastic member from an inner side surface or an outer side surface of the ring-shaped elastic member.

As for the seal described above, the elastic member is molded on the embedded member through an overmolding process.

As for the seal described above, the supporting portion continuously extends to form a ring shape.

As for the seal described above, the blocking portion continuously extends to form a ring shape.

As for the seal described above, the embedded member comprises a plurality of the blocking portions spaced apart.

As for the seal described above, the embedded member comprises a generally "T"-shaped axial cross section, an upper portion of the shape "T" corresponds to the supporting portion, and a lower portion of the shape "T" corresponds to the blocking portion.

As for the seal described above, the supporting portion is provided with several through holes to facilitate molding the elastic member on the embedded member through an overmolding process.

As for the seal described above, the cross section of the supporting portion of the embedded member is elongated, the elongated cross section of the supporting portion is arc-shaped at two ends in its lengthwise direction; and the cross section of the elastic member is elongated, and the elongated cross section of the elastic member is arc-shaped at two ends in its lengthwise direction.

As for the seal described above, the inner side surface or the outer side surface of the ring-shaped elastic member is provided with a plurality of protrusions.

As for the seal described above, the blocking portion is configured to be able to fit a seal installing groove in the regulating valve so as to block the movement of the seal relative to the seal installing groove.

As for the seal described above, the through holes are elongated.

Another aspect of the present disclosure is to provide a regulating valve, the regulating valve comprising a housing, a valve body and a plurality of (e.g., several) seals described above, wherein an interior of the housing forms a receiving cavity, the housing comprises several pipe orifices, each of the several pipe orifices is capable of being in fluid communication with the receiving cavity, the valve body is disposed in the receiving cavity and is able to rotate about a rotation axis, the valve body is configured to open or close at least one of the several pipe orifices through its rotation, and the several seals are respectively disposed between the housing and the valve body, and configured to enable the sealing engagement of each of the several pipe orifices with the valve body.

The seal of the present disclosure not only has a simple structure, but also enables stable sealing assembly between the housing and the valve body, which facilitates automatic assembly of the regulating valve, and reduces the production cost of the regulating valve.

BRIEF DESCRIPTION OF THE DRAWINGS

These and other features and advantages of the present disclosure may be better understood by reading the following detailed description with reference to the accompanying drawings. The same reference numerals represent the same components throughout the accompanying drawings, in which.

DETAILED DESCRIPTION OF EMBODIMENTS

Figure 1:
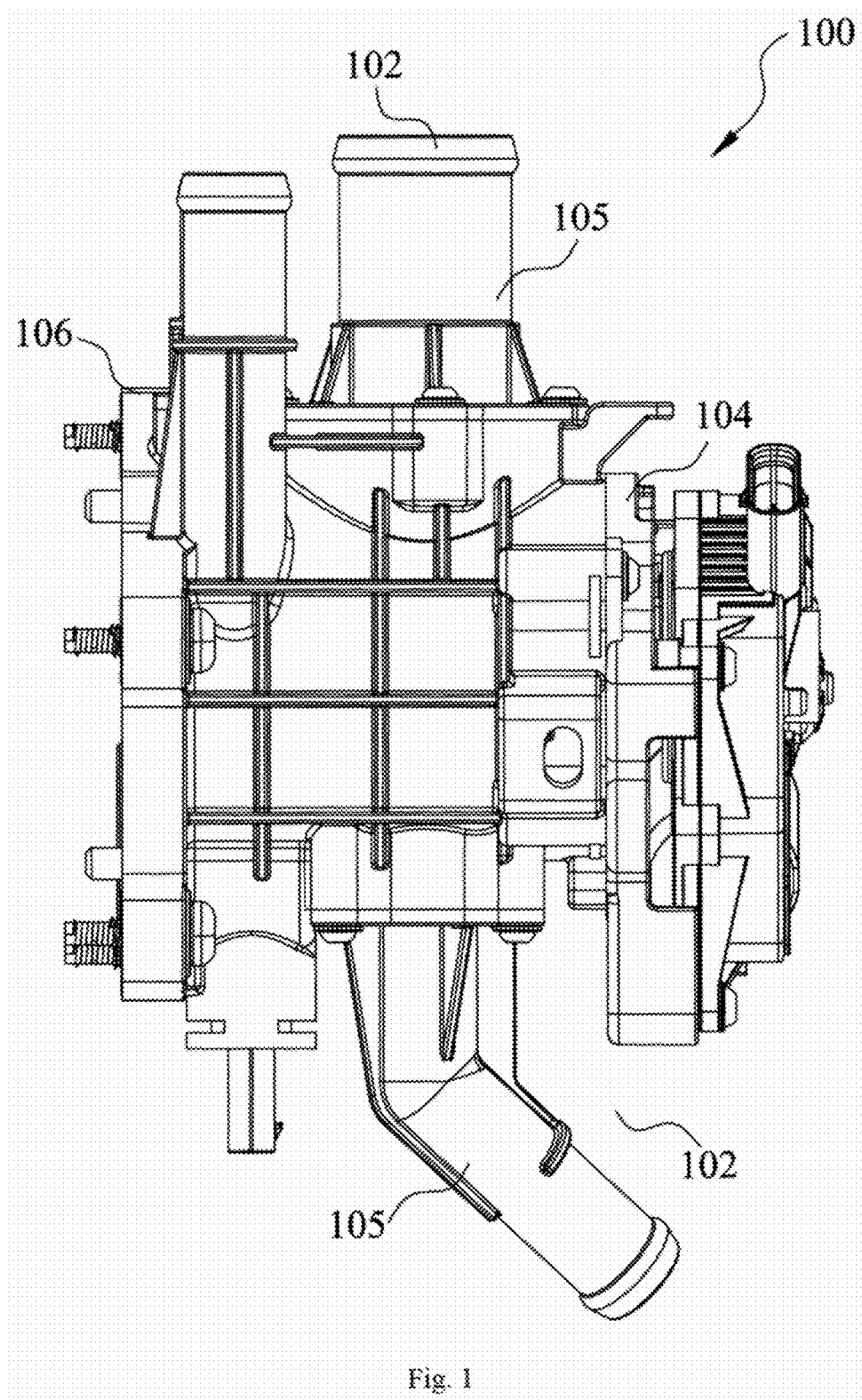
FIG. 1 is a front elevational view of a regulating valve 100 of an embodiment of the present disclosure.

Various specific embodiments of the present disclosure are described below with reference to the accompanying drawings which constitute part of this description. It should be understood that, although the terms such as "front", "rear", "upper", "lower", "left", and "right" indicating directions in the present disclosure are used to describe various exemplary structural parts and elements in the present disclosure, these terms used herein are merely used for ease of description and are determined based on the exemplary orientation shown in the accompanying drawings. Since the embodiments disclosed in the present disclosure can be arranged in different directions, these terms indicating directions are only illustrative and should not be considered as limitations. If possible, the same or similar reference numerals used in the present disclosure refer to the same components.

Referring to FIG. 1, a regulating valve 100 of an embodiment of the present disclosure is shown having a housing 106. The housing 106 comprises a housing main body 104 and a communicating pipe 105. In this embodiment, the regulating valve 100 comprises two communicating pipes 105. The two communicating pipes 105 are detachably installed on the housing main body 104 and are respectively located on upper and lower sides of the housing main body 104. The ends of the two communicating pipes 105 can be respectively connected to an external pipeline (not shown). When the regulating valve 100 is installed in the external pipeline, a fluid from the external pipeline can be communicated, blocked, or controlled in flow rate through the regulating valve 100.

Figure 2A:
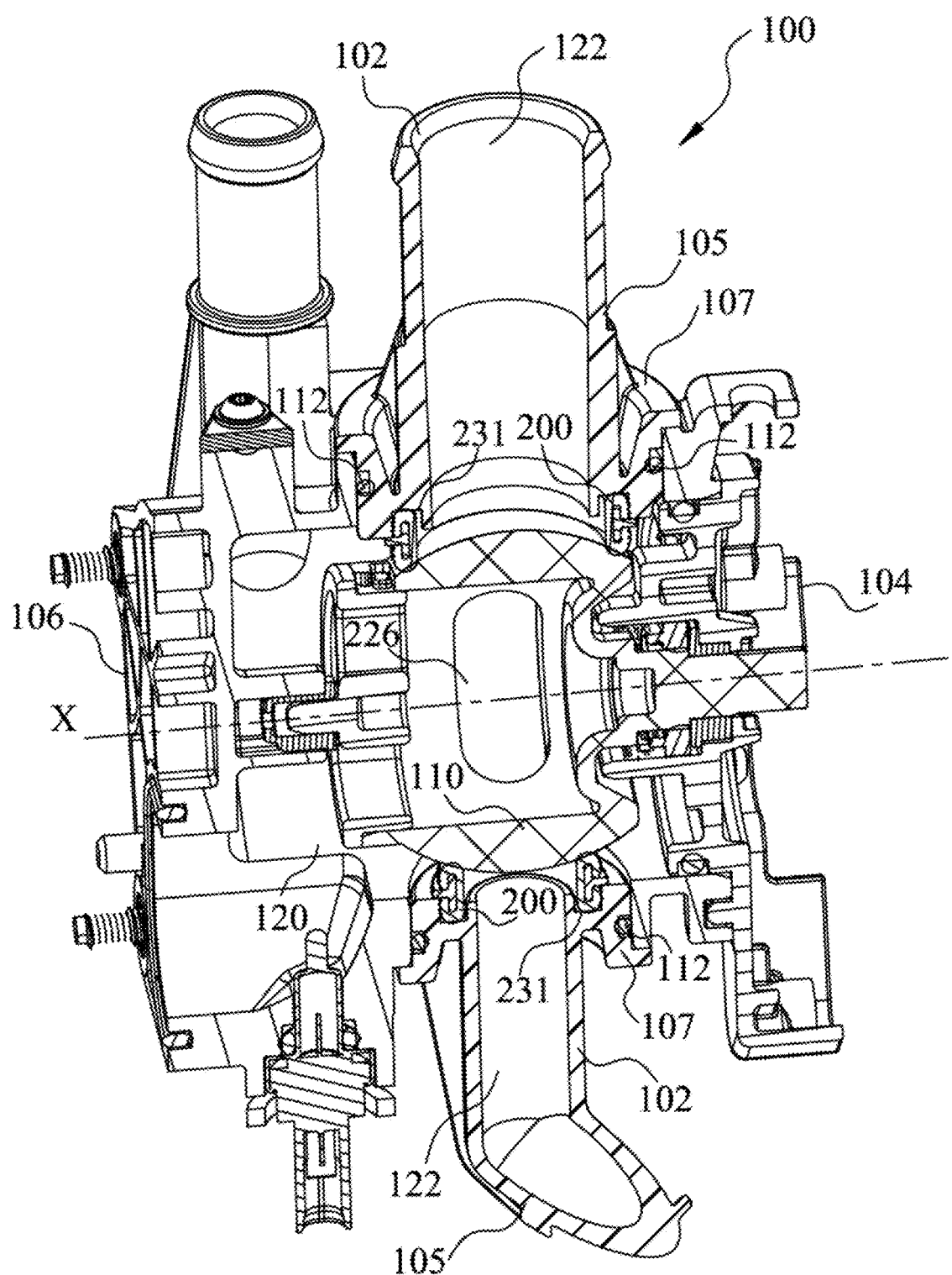
FIG. 2A is a perspective cross-sectional view of the regulating valve 100 of FIG. 1.
Figure 2B:
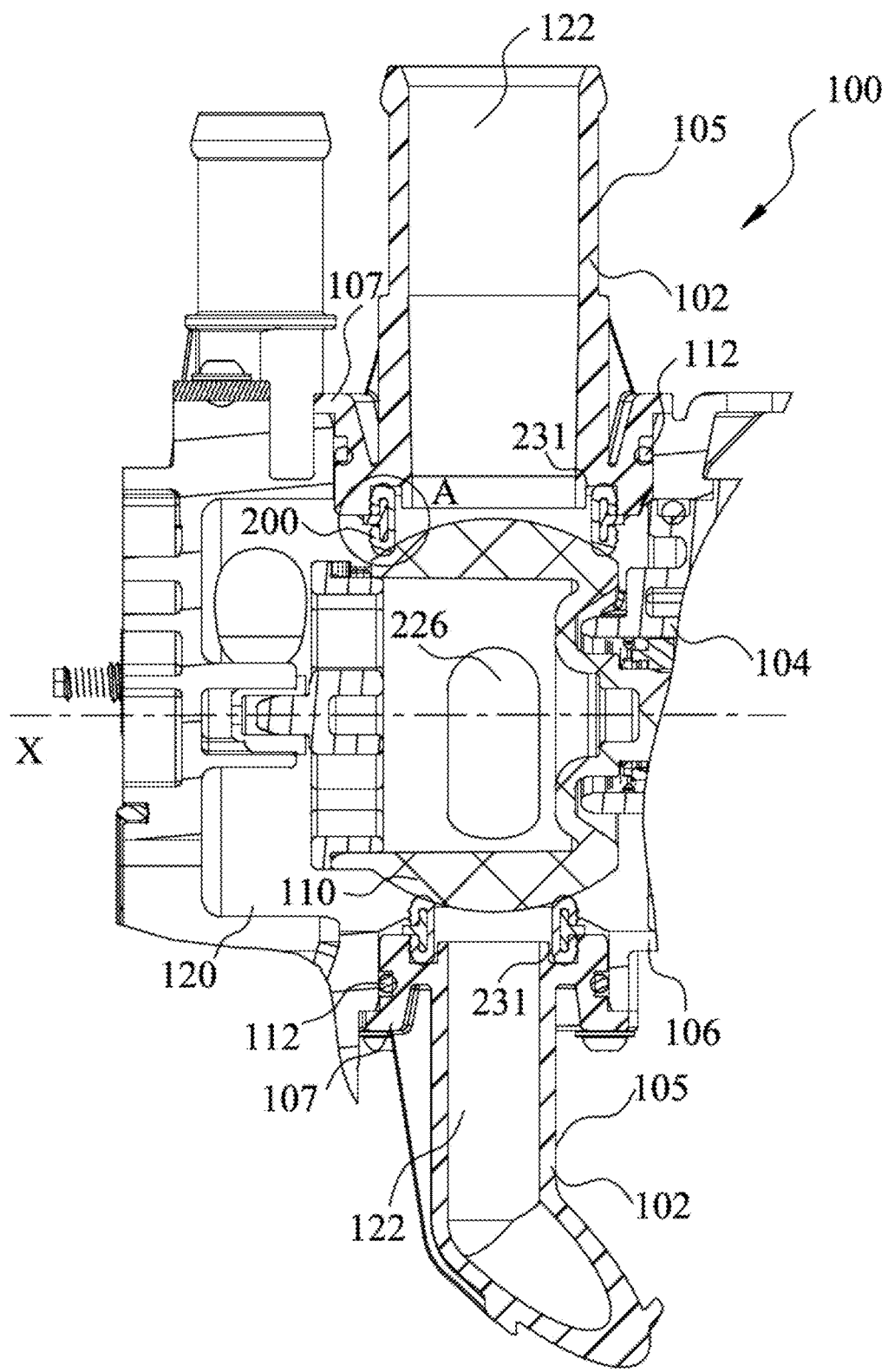
FIG. 2B is a perspective partial cross-sectional view of the regulating valve 100 of FIG. 2A.

As shown in FIGS. 2A and 2B, the regulating valve 100 further comprises a valve body 110, two pipe orifice sealing rings 112 and two seals 200. The valve body 110 is generally spherical, and the regulating valve 100 can realize the functions of opening, closing and control of flow rate through the rotation of the valve body 110. When the regulating valve 100 is in an open state, the regulating valve 100 can allow the fluid to pass through the regulating valve 100 to communicate with the external pipeline; and when the regulating valve 100 is in a closed state, the regulating valve 100 can block the fluid from passing through the regulating valve 100 to disconnect from the external pipeline. The two pipe orifice sealing rings 112 are both ring-shaped, which enable a sealed connection between each of the two communicating pipes 105 and the housing main body 104. The two seals 200 are also generally ring-shaped, and are used to enable a sealed connection between the valve body 110 and the housing 106.

The housing 106 is provided with a receiving cavity 120 in the housing main body 104 for receiving the valve body 110. Each communicating pipe 105 of the housing 106 is provided with one communicating hole 122 within each communicating pipe 105, wherein each communicating hole 122 communicates with the receiving cavity 120 of the housing main body 104. The communicating hole 122 runs through the entire passage of a corresponding one of the communicating pipes 105 so that the external pipeline is in fluid communication with the receiving cavity 120 in the housing main body 104. The communicating pipe 105 comprises a pipe orifice 102 and a connecting portion 107. The pipe orifice 102 is in the shape of a round pipe and is used to connect with the external pipeline. The connecting portion 107 is located between the pipe orifice 102 and the housing main body 104, and the configuration of the connecting portion 107 facilitates a detachable connection between the communicating pipe 105 and the housing main body 104.

The two pipe orifice sealing rings 112 are provided corresponding to the two communicating pipes 105 of the housing 106, wherein each pipe orifice sealing ring 112 is provided around an outer periphery of the connecting portion 107 of a corresponding one of the communicating pipes 105. When the two communicating pipes 105 are installed on the housing main body 104, the two pipe orifice sealing rings 112 respectively abut between the housing main body 104 and a corresponding one of the communicating pipes 105 to enable a sealed connection between the communicating pipe 105 and the housing main body 104.

The two seals 200 are respectively provided between the valve body 110 and a corresponding one of the communicating pipes 105 to enable a sealed connection between each of the two communicating pipes 105 and the valve body 110. In order to receive the seals 200 and ensure fixed installation of the two seals 200 in the regulating valve 100, the two communicating pipes 105 are respectively provided with one seal installing groove 231 on an end surface at the side facing the valve body 110. The two seal installing grooves 231 each are grooves with a certain depth. Therefore, each seal installing groove 231 can at least partially receive a corresponding one of the seals 200. The two seal installing grooves 231 are both ring-shaped, and an inner diameter of each seal installing groove 231 is larger than the diameter of the communicating hole 122 of its corresponding one of the communicating pipes 105. Thus, each seal installing groove 231 can be respectively provided around an outer periphery of the communicating hole 122 of the corresponding one of the communicating pipes 105.

The spherical valve body 110 has a rotation axis X about which the valve body 110 can rotate. The valve body 110 is provided with a fluid channel 226 within the valve body 100. The fluid channel 226 extends from the interior to an outer surface of the valve body 110 to form two openings (not shown) on the outer surface of the valve body 110. The two openings on the valve body 110 are disposed such that the two openings can be respectively aligned with the two pipe orifices 102 on the housing 106 when the valve body 110 rotates about the rotation axis X to a certain position. When the two openings on the valve body 110 are respectively aligned with the two pipe orifices 102 on the housing 106, the regulating valve 100 is in a full open state, and there is a maximum fluid flow flux between the two pipe orifices 102. As the valve body 110 rotates in the housing 106 about the rotation axis X, the two openings on the valve body 110 are gradually misaligned with the two pipe orifices 102, and an allowed fluid flow flux between the two pipe orifices 102 is gradually reduced. When the two openings on the valve body 110 are completely misaligned with the two pipe orifices 102, the regulating valve 100 is in a closed state, and the fluid cannot flow through between the two pipe orifices 102.

During operation of the regulating valve 100, as the valve body 110 rotates about the rotation axis X, the two seals 200 always abut against the outer surface of the valve body 110, thereby ensuring the sealed connection between the valve body 110 and the communicating pipes 105. With the sealed connection between the valve body 110 and the communicating pipes 105 by the seals 200, the fluid flowing from the communicating holes 122 inside the pipe orifices 102 to the valve body 110 will not overflow to the area of the receiving cavity 120 of the regulating valve 100 outside the seal 200.

Figure 3A:
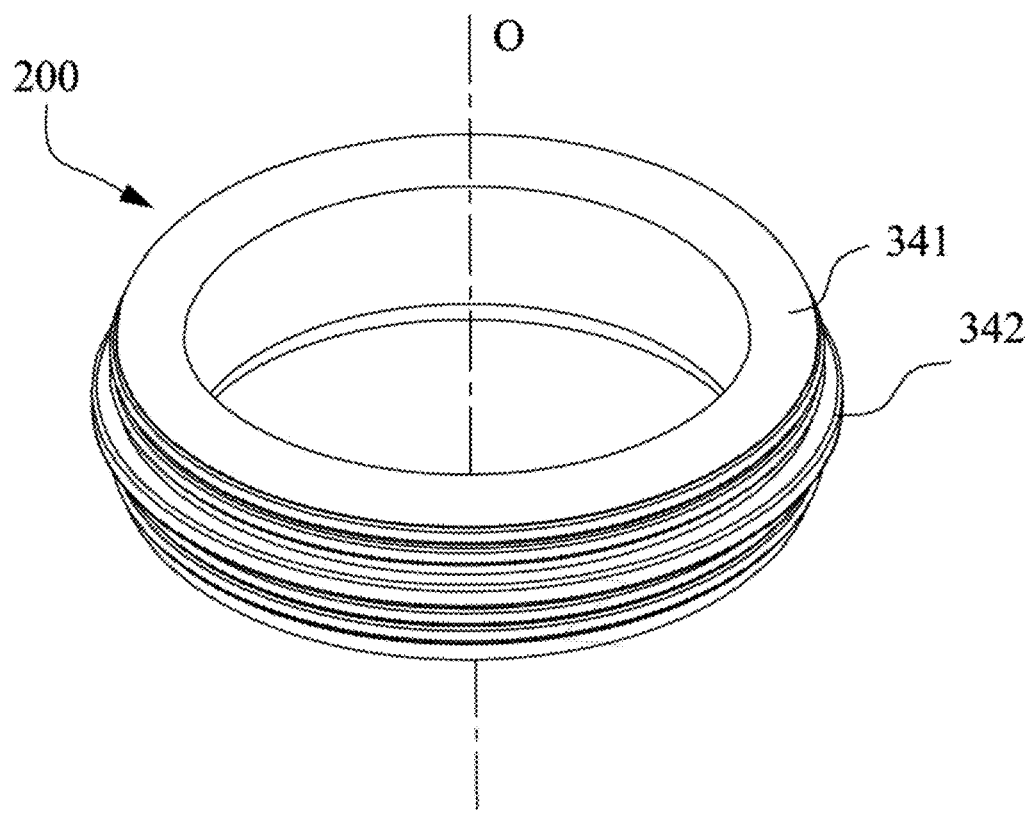
FIG. 3A is a perspective view of the seal 200 of FIG. 2B.
Figure 3B:
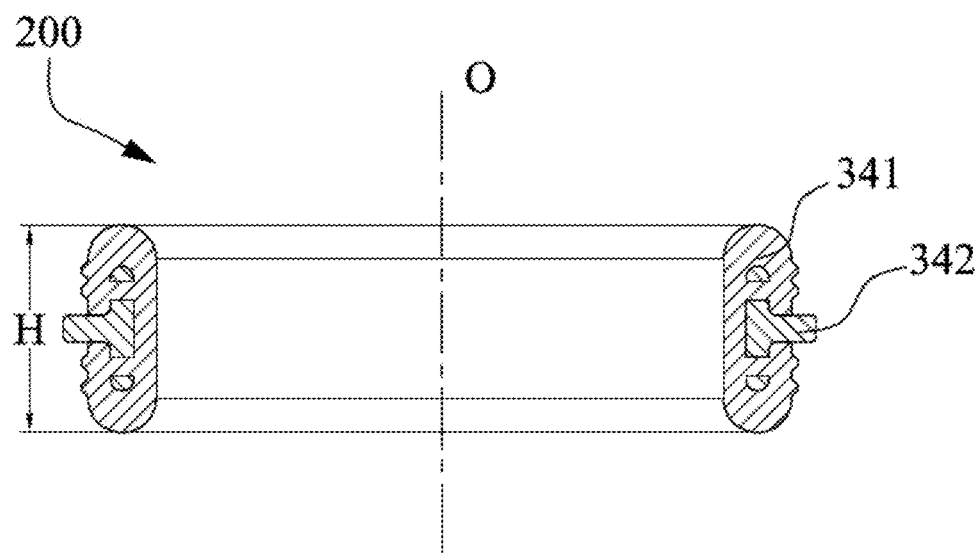
FIG. 3B is an elevational cross-sectional view of the seal 200 of FIG. 3A.

As shown in FIGS. 3A and 3B, the seal 200 is in the shape of a circular ring as a whole and has a central axis O. It will be appreciated from FIG. 3B that an embedded member 342 has an embedded relationship with an elastic member 341 of the seal 200. The seal 200 has a height H extending along an axial direction of the central axis O. The seal 200 comprises the elastic member 341 and an embedded member 342, wherein the hardness of the embedded member 342 is greater than that of the elastic member 341, and the elastic coefficient of the elastic member 341 is greater than that of the embedded member 342. In one example, the embedded member 342 is made of plastic, and the elastic member 341 is made of thermoplastic elastomer.

Both the elastic member 341 and the embedded member 342 are ring-shaped, and the directions in which the two ring-shaped bodies extends circumferentially are the same. As shown in FIG. 3B, the elastic member 341 and the embedded member 342 are nested with each other, wherein a part of the embedded member 342 is wrapped inside the elastic member 341, and the other part of the embedded member 342 protrudes from the elastic member 341. In this embodiment, the elastic member 341 is connected to the embedded member 342 during an overmolding process. In other embodiments, the embedded member 342 may be embedded in the elastic member 341 in other ways. Since the embedded member 342 with higher hardness is wrapped in the elastic member 341 with lower hardness, the embedded member 342 can support the elastic member 341 and the property of easy deformation of the elastic member 341 can be utilized to enable a sealing function of the whole seal 200. Since the elastic coefficient of the elastic member 341 is relatively large, when the elastic member 341 located at the outer side of the seal 200 is in contact with the surface of the valve body 110, the elastic member 341 can be deformed to fit the shape of the valve body 110, thus the fluid flowing inside of the seal 200 is prevented from flowing out from a gap between the seal 200 and the valve body 110. Due to greater hardness of the embedded member 342, a supporting effect of the embedded member 342 can control the elastic deformation of the elastic member 341 to a reasonable level, so as to prevent the elastic member 341 from slipping out of the seal installing groove 231 due to an excessive deformation of the elastic member 341 during the rotation of the valve body 110.

Figure 4A:
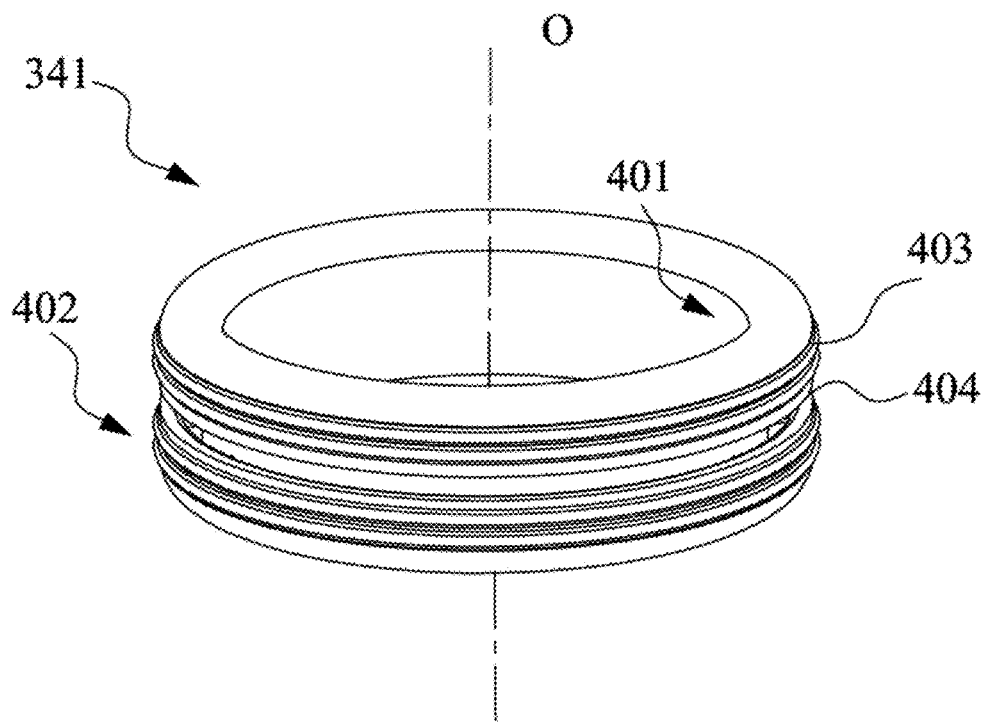
FIG. 4A is a perspective view of an elastic member 341 of FIG. 3A.
Figure 4B:
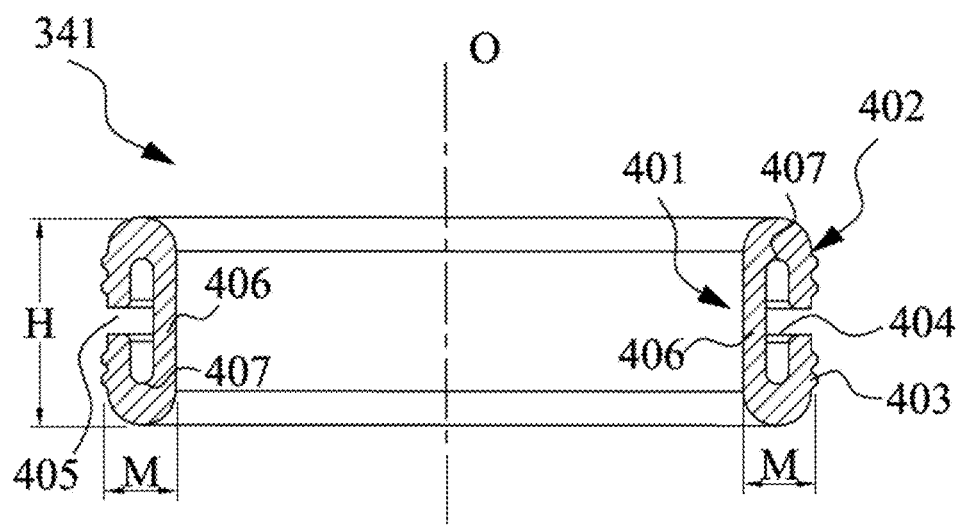
FIG. 4B is an elevational cross-sectional view of the elastic member 341 of FIG. 4A.

As shown in FIGS. 4A and 4B, the elastic member 341 is ring-shaped, and its axial height in the direction along the central axis O of the seal 200 is the same as that of the seal 200, which is also H. As shown in FIG. 4B, along the direction of the central axis O of the seal 200, the cross section of the elastic member 341 presents two disconnected elongated patterns 406. Both upper and lower ends of the elongated cross sections 406 are arc-shaped. That is to say, the elastic member 341 has an arc-shaped chamfer at each of the upper and lower ring-shaped ends in the direction along the central axis O of the seal 200. The ring-shaped elastic member 341 also has a receiving space 404 within the body of the elastic member 341, and the receiving space 404 is also ring-shaped and provided around the elastic member 341. The shape of the receiving space 404 matches the shape of the embedded member 342 for receiving the embedded member 342. In the axial cross section of the elastic member 341 as shown in FIG. 4B, the receiving space 404 is arc-shaped at each corner 407. That is to say, the receiving space 404 within the elastic member 341 is provided with an arc-shaped chamfer at each corner 407. As shown in FIG. 4B, a surface located at an inner side of the ring-shaped body of the elastic member 341 is called as an inner side surface 401 of the elastic member 341, and a surface located at an outer side of the ring-shaped body of the elastic member 341 is called as an outer side surface 402 of the elastic member 341. The distance between the inner side surface 401 and the outer side surface 402 of the elastic member 341 is M, which is a radial thickness of the elastic member 341. The receiving space 404 is provided with an opening 405 at the outer side surface 402 of the elastic member 341. The opening 405 is located at the middle of the elastic member 341 along the axial direction of the elastic member 341, and the opening 405 is disposed around the circumference of the elastic member 341 and is a ring-shaped opening. The outer side surface 402 of the elastic member 341 is also provided with a plurality of protrusions 403, and each protrusion 403 is ring-shaped and disposed around the outer periphery of the elastic member 341. The elastic member 341 of this embodiment is provided with four protrusions 403, among which, two protrusions 403 are located above the opening 405, and the other two protrusions 403 are located under the opening 405. In other embodiments, other numbers of protrusions 403 may also be provided on the outer surface of the elastic member 341.

Figure 5A:
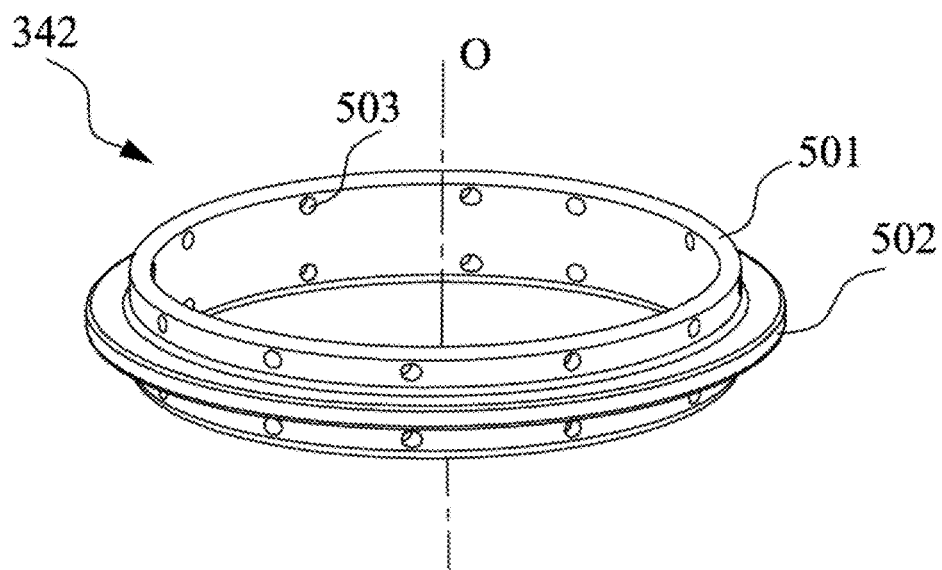
FIG. 5A is a perspective view of an embedded member 342 of FIG. 3A, the embedded member 342 depicted with a plurality of holes 503.
Figure 5B:
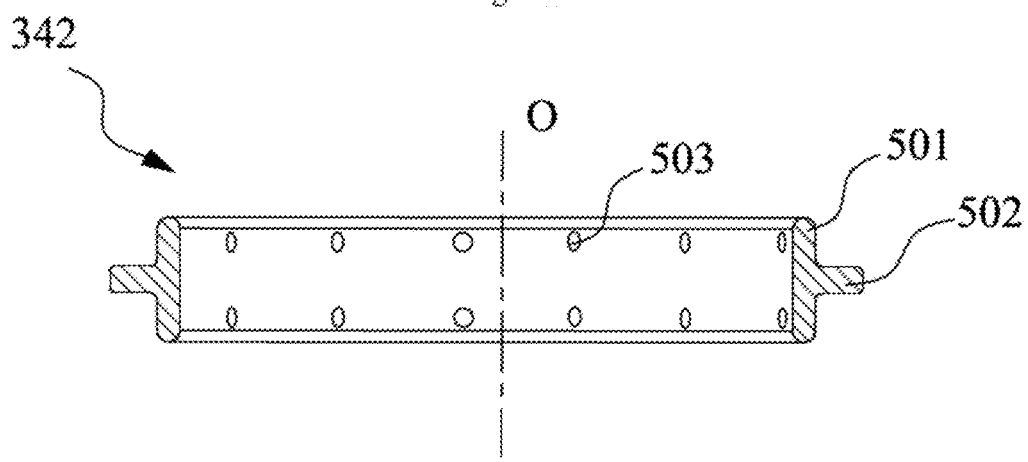
FIG. 5B is an elevational cross-sectional view of the embedded member 342 of FIG. 5A, taken along a line positioned between the plurality of holes 503.
Figure 5C:
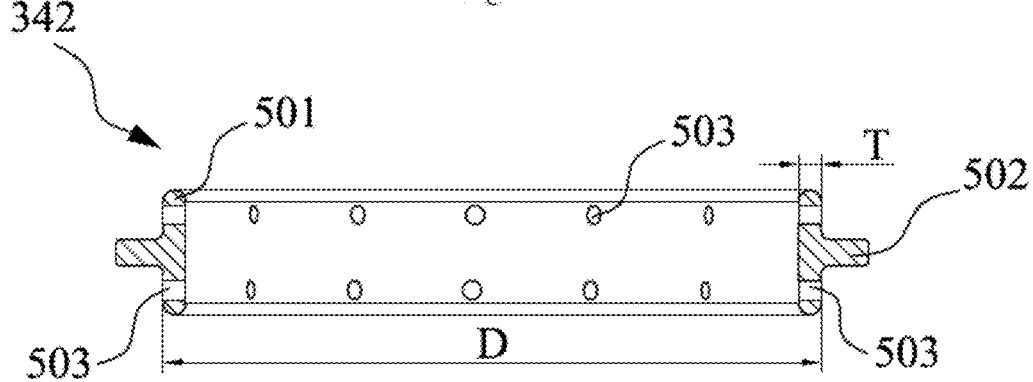
FIG. 5C is an elevational cross-sectional view of the embedded member 342 of FIG. 5A, taken along a line positioned through the plurality of holes 503.

As shown in FIGS. 5A to 5C, the embedded member 342 is also ring-shaped, and comprises a supporting portion 501 and a blocking portion 502. The supporting portion 501 is in the shape of a circular ring and has a certain height. The height of the supporting portion 501 is greater than that of the blocking portion 502. The blocking portion 502 continuously extends to be ring-shaped. The blocking portion 502 is located in the middle of the supporting portion 501, and is disposed around an outer surface of the supporting portion 501. The above configuration makes the cross section of the embedded member 342 along the direction of the central axis O of the seal 200 a generally "T"-shaped pattern. The supporting portion 501 is disposed vertically, i.e., in an axial direction, and the blocking portion 502 is disposed laterally, i.e., radially. As shown in FIGS. 5B and 5C, both upper and lower ends of the axial cross section of the supporting portion 501 are arc-shaped. That is to say, the ring-shaped end surfaces of both upper and lower ends of the supporting portion 501 each have an arc-shaped chamfer. As shown in FIGS. 5B and 5C, the axial cross section of the embedded member 342 has an arc-shaped smooth transition at the connection of the supporting portion 501 and the blocking portion 502. That is, there is also an arc-shaped chamfer at the connection of the supporting portion 501 and the blocking portion 502. Combining FIGS. 5B, 5C and 4B, it can be seen that, in order to fit the configuration of the arc-shaped chamfer at an end of the embedded member 342, the receiving space 404 of the elastic member 341 is designed with an arc-shaped chamfer on the inner surface at both the upper and lower ends of the receiving space 404, and is designed with an arc-shaped chamfer on the inner surface at the corner of the opening of the receiving space 404. As a result, the corners where the embedded member 342 contact the elastic member 341 have a smooth transition to prevent stress concentration between the embedded member 342 and the elastic member 341 during the compression of the seal 200. In this embodiment, the blocking portion 502 is continuously ring-shaped; in other embodiment, the blocking portion 502 can also be provided in sections at intervals, for example, a plurality of blocking portions 502 are provided on an outer periphery of the supporting portion 501 at intervals, and the plurality of blocking portions 502 surround the entire circumference of the supporting portion 501 as a whole.

The embedded member 342 is further provided with a plurality of through holes 503 on the supporting portion 501. The section-cut position of the cross-sectional view shown in FIG. 5B does not cut the through holes 503, while the section-cut position of the cross-sectional view shown in FIG. 5C cuts the through holes 503. As shown in FIG. 5C, each through hole 503 runs through the T direction along the thickness of the supporting portion 501. In this embodiment, the plurality of through holes 503 are provided in two rows in the supporting portion 501, and the numbers of through holes 503 of the two rows are the same. The through holes 503 in each row are disposed in the circumferential direction of the supporting portion 501, and the distance between each two adjacent through holes 503 in each row is the same. In conjunction with FIG. 3B, it can be seen that, when the elastic member 341 is molded onto the embedded member 342 during an overmolding process, the elastic member 341 can be injection molded into the through holes 503. That is, part of the elastic member 341 runs through the through holes 503. The above configuration can ensure that the elastic member 341 and the embedded member 342 are relatively fixed, which facilitates a stable connection between the elastic member 341 and the embedded member 342. In this embodiment, the through holes 503 of the embedded member 342 are circular; and in other embodiments, the through holes 503 can also be designed with other shapes.

Figure 6:
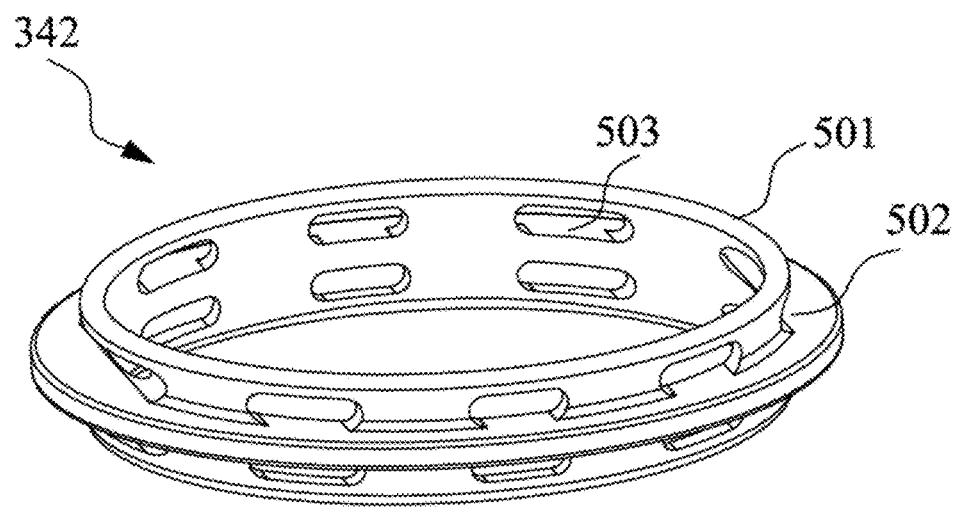
FIG. 6 shows a perspective view of another embodiment of an embedded member 342.

FIG. 6 shows a perspective view of an embedded member 342 of another embodiment of the present disclosure. As shown in FIG. 6, another embodiment of the embedded member 342 is depicting as having a configuration of through holes 503, similar to those of the through holes 503 in the embedded member 342 shown in FIGS. 5A to 5C, but with grouping of the through holes 503 in FIG. 6 into upper and lower rows. The through holes 503 shown in FIGS. 5A to 5C are circular, while the through holes 503 in the embodiment of FIG. 6 are elongated. As shown in FIG. 6, an extension direction of the elongated through holes 503 is consistent with a circumferential direction of the embedded member 342. The structural configuration of the elongated through holes 503 provides the through holes 503 with an enlarged cross sectional area, thereby allowing a larger volume of the elastic member 341 to be embedded into the embedded member 342. A larger volume of the elastic member 341 embedding into the embedded member 342 facilitates a more stable connection between the elastic member 341 and the embedded member 342. Accordingly, when an external squeeze is exerted on the seal 200, the embedded member 342 is not easy to slip out of the elastic member 341. That is to say, designing the through holes 503 of the embedded member 342 to be elongated can ensure the stability of the connection structure between the elastic member 341 and the embedded member 342.

Figure 7:
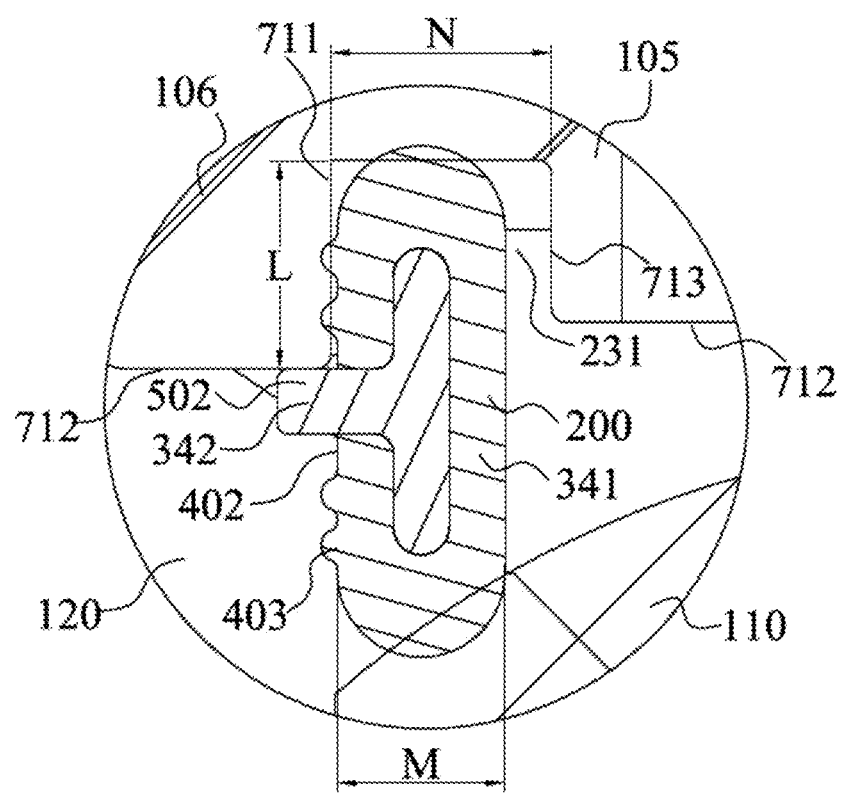
FIG. 7 shows an enlarged partial cross-sectional view of the regulating valve 100 shown in FIG. 2B.

As shown in FIG. 7, the seal 200 is installed in the seal installing groove 231 in the housing 106. One of axial ring-shaped ends of the seal 200 abuts in the seal installing groove 231, and the other axial ring-shaped end abuts against the outer surface of the valve body 110. Thus, the whole seal 200 is located between the housing 106 and the valve body 110. During the regulation of the flow rate in the fluid channel 226 through the regulating valve 100 by rotating the valve body 110, the seal 200 always abuts between the housing 106 and the valve body 110 such that a sealed flow path is formed between the valve body 110 and the corresponding communicating pipe 105. As shown in FIG. 7, the cross section at the bottom of the seal installing groove 231 is generally rectangular. The radial width N at the bottom of the seal installing groove 231 is slightly larger than the radial thickness M of the elastic member 341 of the seal 200. Therefore, the seal 200 can be completely received in the seal installing groove 231 in the radial direction, and a ring-shaped end along the axial direction of the seal 200 can abut against the bottom of the seal installing groove 231. Since the seal 200 is provided with an arc-shaped chamfer at the ring-shaped end of the elastic member 341, when the ring-shaped end of the seal 200 abuts against the bottom of the seal installing groove 231, there is a larger contact area between the ring-shaped end and the seal installing groove 231. The above configuration can prevent stress concentration between the end of the seal 200 and the seal installing groove 231, especially when the seal 200 is subjected to a large external force, so as to prolong the service life of the seal 200.

An outer side wall 711 of the ring-shaped groove body of the seal installing groove 231 has a height L, which is designed such that the end of the blocking portion 502 extending toward the outer side surface 402 of the elastomer just abuts against an end surface 712 of the outer side wall 711. The end surface 712 of the outer side wall 711 is part of the inner surface of the housing 106 facing the receiving cavity 120. The abutment configuration of the blocking portion 502 on the housing 106 prevents the seal 200 from moving toward the seal installing groove 231, which facilitates preventing the seal 200 from being excessively deformed under the squeezing of the housing 106 and the valve body 110. In addition, the height L of the outer side wall 711 should ensure that the seal installing groove 231 has a certain depth so that the seal 200 can be stably installed in the seal installing groove 231. In this embodiment, at least ⅓ of the volume of the seal 200 is received in the seal installing groove 231.

When the seal 200 is installed between the valve body 110 and the housing 106, the valve body 110 abuts on the side of the seal 200 facing the valve body 110. When the valve body 110 abuts on the side of the seal 200 facing the valve body 110, some protrusions 403 on the elastic member 341 just abut against the outer side wall 711 of the seal installing groove 231. The configuration of the protrusions 403 of the elastic member 341 facilitates a sealing effect of the seal 200 in the seal installing groove 231, and provides a deformation space for the elastic deformation of the seal 200 due to squeezing.

The seal 200 of the present application comprises the elastic member 341 and the embedded member 342, wherein the embedded member 342 is at least partially embedded in the elastic member 341. The greater material hardness of the embedded member 342 provides a support to the elastic member 341 and prevents the elastic member 341 from slipping out of the seal installing groove 231 due to the large deformation of the elastic member 341 caused by squeezing. The elastic member 341 and the embedded member 342 in this embodiment are molded together by an overmolding process, and their simple structure and preparation process facilitate the manufacturing the seal 200 into a smaller size, which in turn facilitates miniaturization of the structure of the regulating valve 100. In addition, the simple structure of the seal 200 of the present disclosure also simplifies the assembly structure of the regulating valve 100, which facilitates assembly automation.

In order to match the spherical valve body 110, the seal 200 in the embodiment of the present disclosure is formed in the shape of a circular ring. In other embodiments, the seal 200 may also be a ring of other shapes, for example, when the valve body 110 is cylindrical, in order to match the cylindrical valve body, a saddle-shaped ring-shaped seal 200 can be made.

In this embodiment, the two communicating pipes 105 are detachably installed on the housing main body 104; and in other embodiments, the communicating pipes 105 and the housing main body 104 can also be integrally formed. In addition, in other embodiments, other numbers of pipe orifices 102 may be provided on the housing 106 as required, for example, three, four, and so on. Accordingly, the number of the seal 200 is also provided to match the number of the pipe orifices 102.

In this embodiment, the seal 200 is installed on the housing 106, while in other embodiments, the seal 200 can be installed on a support frame which can be further provided. In such embodiments, the seal installing grooves 231 are provided on the support frame, and the number of the seal installing grooves 231 corresponds to the number of the seals 200.

In this embodiment, the cross section of the embedded member 342 is "T"-shaped, the blocking portion 502 of the embedded member 342 is provided toward the outer side surface 402 of the elastic member 341, and the blocking portion 502 abuts against the end surface 712 of the outer side wall 711 of the ring-shaped groove body of the seal installing groove 231. In some embodiments, the blocking portion 502 of the embedded member 342 may also be provided toward the inner side surface 401 of the elastic member 341, and accordingly, the blocking portion 502 abuts against the end surface 712 of an inner side wall 713 of the seal installing groove 231. In some other embodiments, the cross section of the embedded member 342 may also be shaped like "+." That is to say, the embedded member 342 has two blocking portions 502 respectively extending toward the inner side surface 401 and the outer side surface 402 of the elastic member 341, and accordingly, the two blocking portions 502 respectively abut against the end surfaces 712 of the outer side wall 711 and the inner side wall 713 of the seal installing groove 231.

In this embodiment, a plurality of protrusions 403 are provided on the outer side surface 402 of the elastic member 341, while in other embodiment, the plurality of protrusions 403 may also be provided on the inner side surface 401 of the elastic member 341, or on both the outer side surface 402 and the inner side surface 401. When the protrusions 403 are provided on the inner side surface 401 of the elastic member 341, the protrusion 403 may affect the flow speed of the fluid inside the regulating valve 100. Therefore, when the flow speed of the fluid inside the regulating valve 100 needs to be slowed down, the protrusions 403 can be further provided on the inner side surface 401 of the elastic member 341. The protrusions 403 provides on the inner side surface 401 of the elastic member 341 can also facilitate sealing of the seal 200 in the seal installing groove 231 and provide a deformation space for the elastic deformation of the elastic member 341.

Although only some features of the present disclosure are illustrated and described herein, those skilled in the art may make various improvements and changes. Therefore, it should be understood that the appended claims are intended to encompass all the above improvements and changes that fall within the substantial spirit and scope of the present disclosure.

The invention claimed is:

1. A seal for sealing a flow channel between a pipe orifice of a housing and a valve body in a regulating valve, the seal comprising:
    a central axis that defines an axial direction;
    an elastic member that is ring-shaped; and
    an embedded member that is at least partially embedded in the elastic member, wherein a hardness of the embedded member is greater than a hardness of the elastic member, and an elastic coefficient of the elastic member is greater than an elastic coefficient of the embedded member, and
    wherein the embedded member includes a supporting portion extending in the axial direction between a first end and a second end and a blocking portion extending from the supporting portion in a transverse direction, wherein the transverse direction is perpendicular to the axial direction, and wherein the blocking portion is disposed between the first end and the second end of the supporting portion.

2. The seal according to claim 1, wherein
    the supporting portion is embedded in the elastic member; and
    the embedded member further includes the blocking portion that is connected to the supporting portion and extends outwardly relative to an inner side surface or an outer side surface of the ring-shaped elastic member.

3. The seal according to claim 2, wherein the elastic member is molded onto the embedded member during an overmolding process.

4. The seal according to claim 2, wherein the supporting portion forms a ring shape.

5. The seal according to claim 2, wherein the embedded member comprises a generally "T"-shaped cross section, an upper portion corresponding to the supporting portion, and a lower portion corresponding to the blocking portion.

6. The seal according to claim 2, wherein the inner side surface or the outer side surface of the ring-shaped elastic member is surrounded by plurality of protrusions.

7. The seal according to claim 2, wherein the blocking portion engages a seal installing groove in the regulating valve to block the movement of the seal relative to the seal installing groove.

8. The seal according to claim 3, wherein the supporting portion is provided with several holes to facilitate molding the elastic member onto the embedded member during an overmolding process.

9. The seal according to claim 3, wherein the supporting portion of the embedded member has a first arc-shaped chamfer and a second arc-shaped chamfer and the elastic member has a first arc-shaped chamfer and a second arc-shaped chamfer.

10. The seal according to claim 4, wherein the blocking portion forms a ring shape.

11. The seal according to claim 4, wherein the embedded member comprises a plurality of interruptions radially spaced along the blocking portion.

12. The seal according to claim 8, wherein the holes are elongated.

13. The seal according to claim 8, wherein the several holes are formed as through holes extending through a thickness of the supporting portion, the several holes being radially spaced from one another.

14. The seal according to claim 9, wherein the first arc-shaped chamfer is disposed at the first end of the supporting portion and the second arc-shaped chamfer is disposed at the second end of the supporting portion.

15. The seal according to claim 9, wherein the first arc-shaped chamfer of the elastic member is configured to face the second arc-shaped chamfer of the elastic member, and each intersect a line that is parallel to the central axis.

16. A regulating valve, the regulating valve comprising:
a housing, an interior of the housing forming a receiving cavity, the housing comprising a plurality of pipe orifices that are configured to be in fluid communication with the receiving cavity;
a valve body that is provided in the receiving cavity and configured to rotate about a rotation axis, wherein the valve body is configured to open or close at least one of the plurality of pipe orifices through rotation thereof; and
a plurality of seals that are each disposed between the housing and the valve body and configured to sealingly engage each of the plurality of pipe orifices with the valve body,
wherein at least one seal of the plurality of seals has a central axis, and wherein the at least one seal comprises an elastic member and an embedded member that has a generally "T"-shaped cross section, wherein the embedded member is configured to protrude outwardly from the elastic member relative to the central axis.

17. The regulating valve according to claim 16, wherein the at least one seal of the plurality of seals comprises an inner side surface that faces the central axis, and an outer side surface that faces away from the central axis, and the elastic member has a first arc-shaped chamfer that faces a second arc-shaped chamfer, and each chamfer is between the inner side surface and the outer side surface.

18. The regulating valve according to claim 17, wherein the outer side surface has an opening, and a portion of the embedded member extends through the opening.

19. The regulating valve according to claim 18, wherein the embedded member includes a supporting portion that extends in an axial direction and a blocking portion that extends from a middle of the supporting portion.

20. The regulating valve according to claim 19, wherein the embedded member includes several holes, and the blocking portion is disposed between at least two of the several holes.

* * * * *